Dec. 14, 1943.                R. E. PIERCE                2,336,957
                              CUTOFF MACHINE
                           Filed Oct. 2, 1942           5 Sheets-Sheet 1

Robert E. Pierce,
Inventor.
Haynes and Koenig
Attorneys.

Dec. 14, 1943.  R. E. PIERCE  2,336,957
CUTOFF MACHINE
Filed Oct. 2, 1942   5 Sheets-Sheet 2
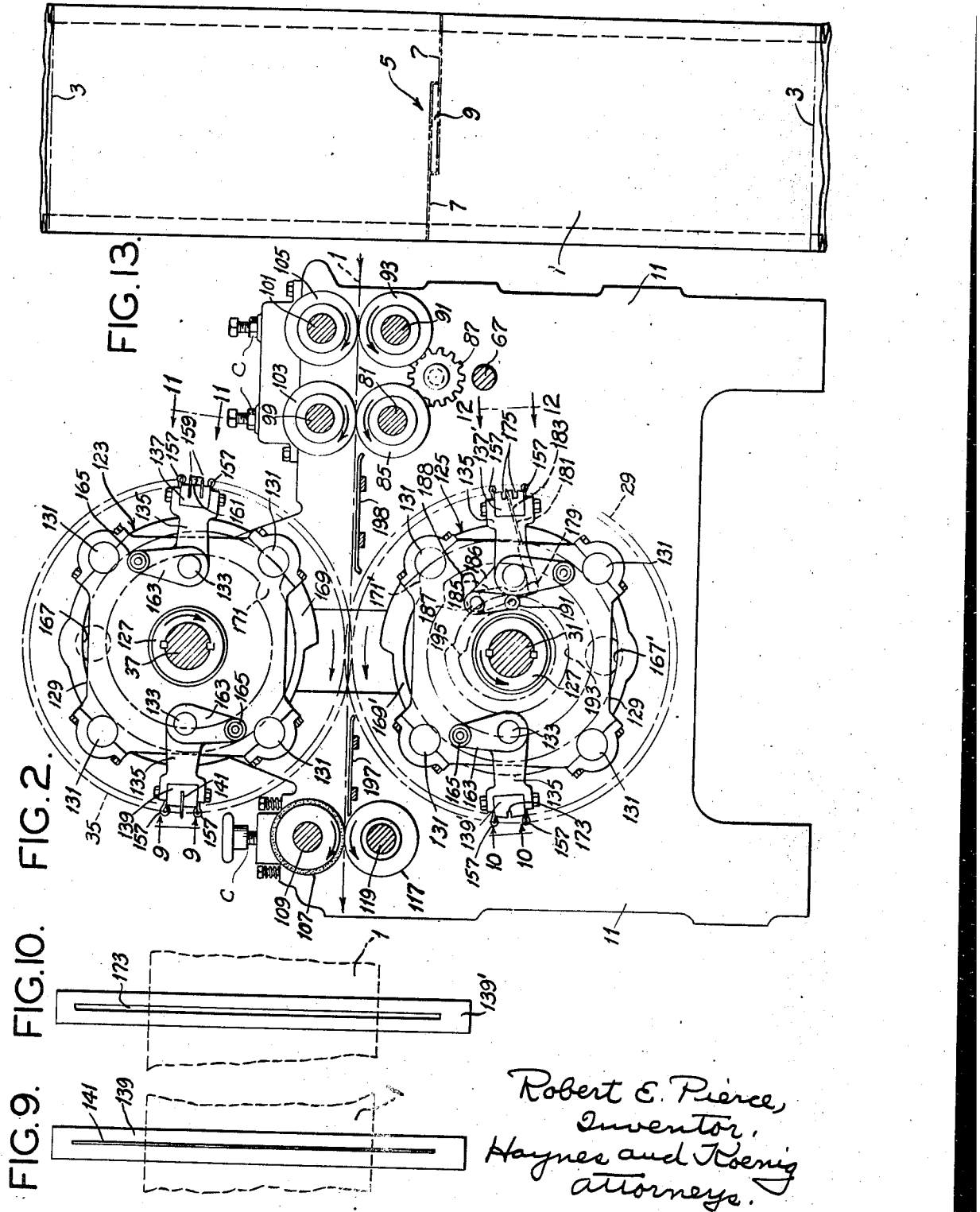
Robert E. Pierce,
Inventor,
Haynes and Koenig
Attorneys.

Dec. 14, 1943.  R. E. PIERCE  2,336,957
CUTOFF MACHINE
Filed Oct. 2, 1942  5 Sheets-Sheet 3
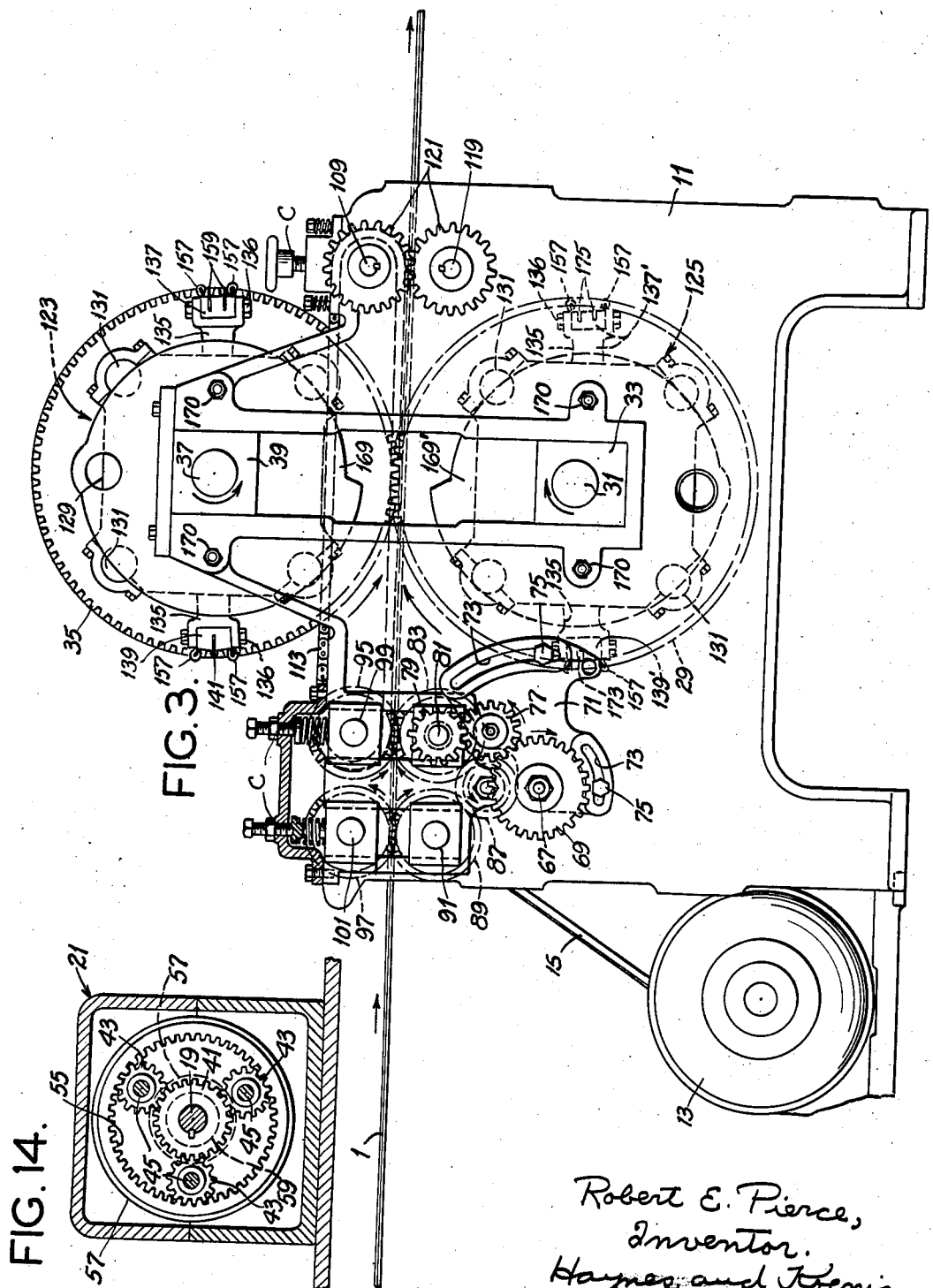
Robert E. Pierce,
Inventor.
Haynes and Koenig
Attorneys.

Dec. 14, 1943.                R. E. PIERCE                2,336,957
                              CUTOFF MACHINE
                           Filed Oct. 2, 1942           5 Sheets-Sheet 4
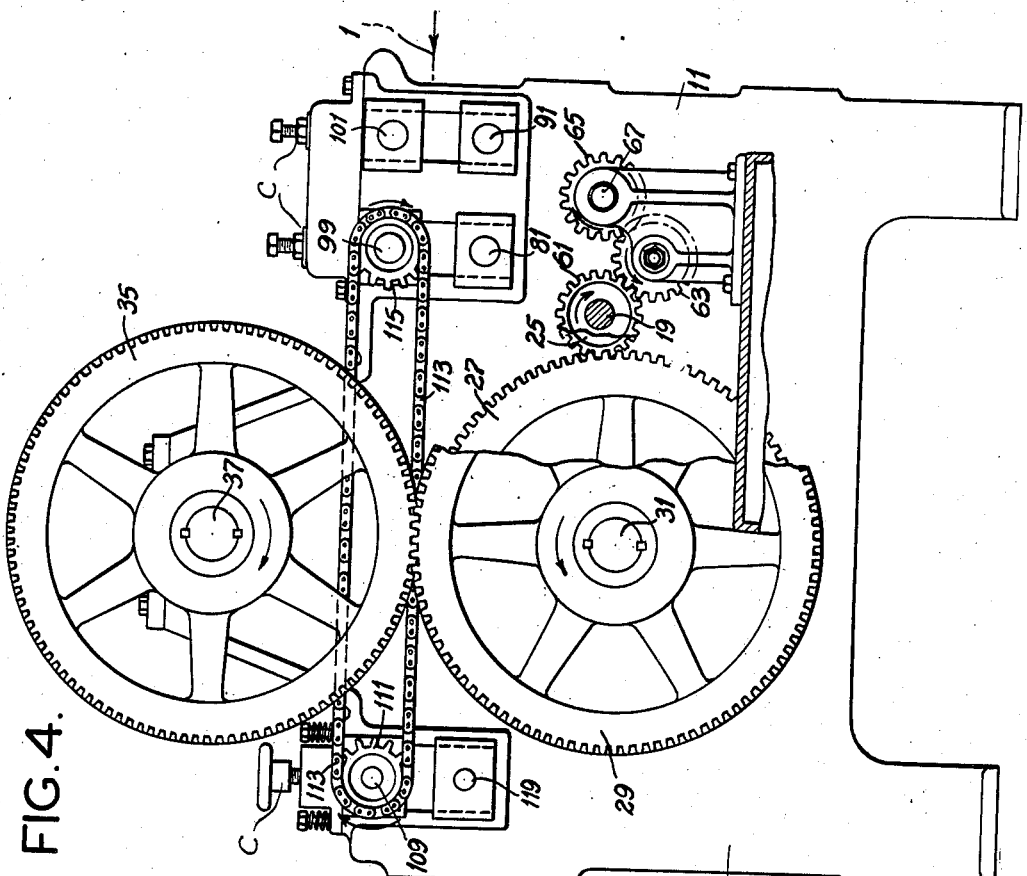
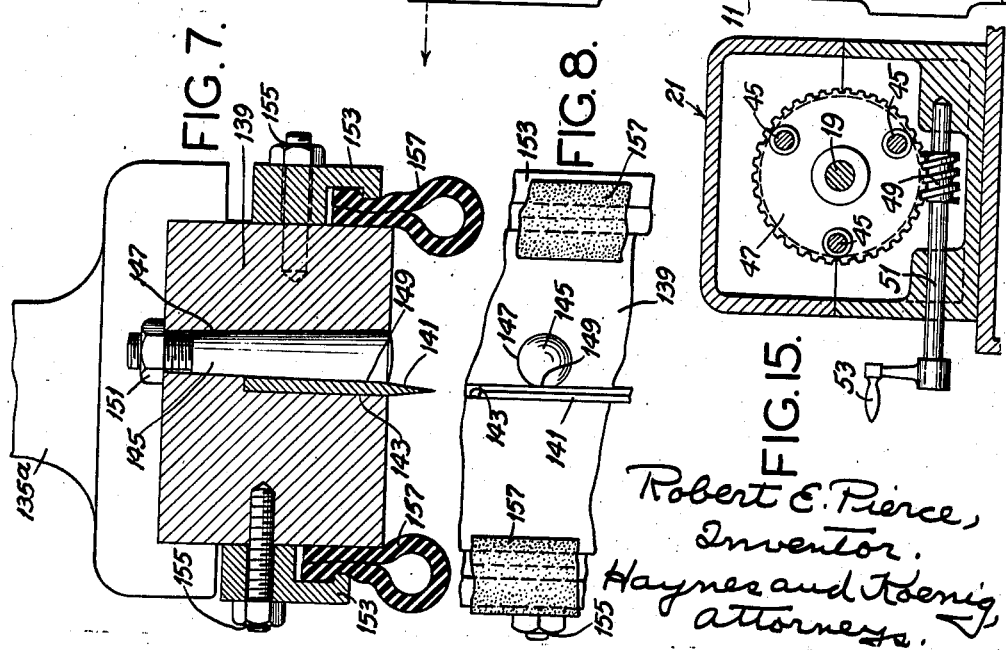
Robert E. Pierce,
      Inventor.
Haynes and Koenig
      Attorneys.

Dec. 14, 1943.                R. E. PIERCE                 2,336,957
                              CUTOFF MACHINE
                          Filed Oct. 2, 1942            5 Sheets-Sheet 5
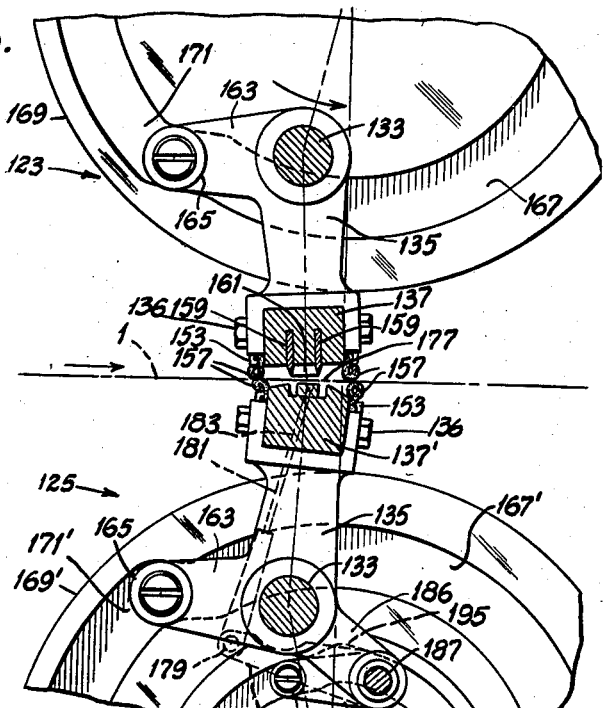
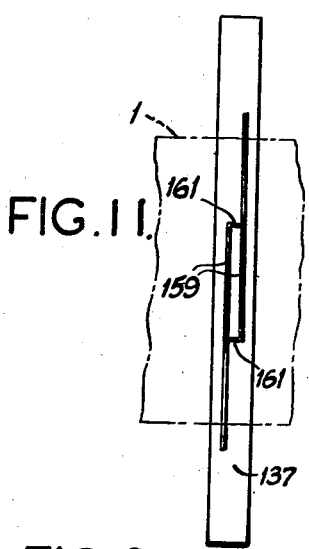
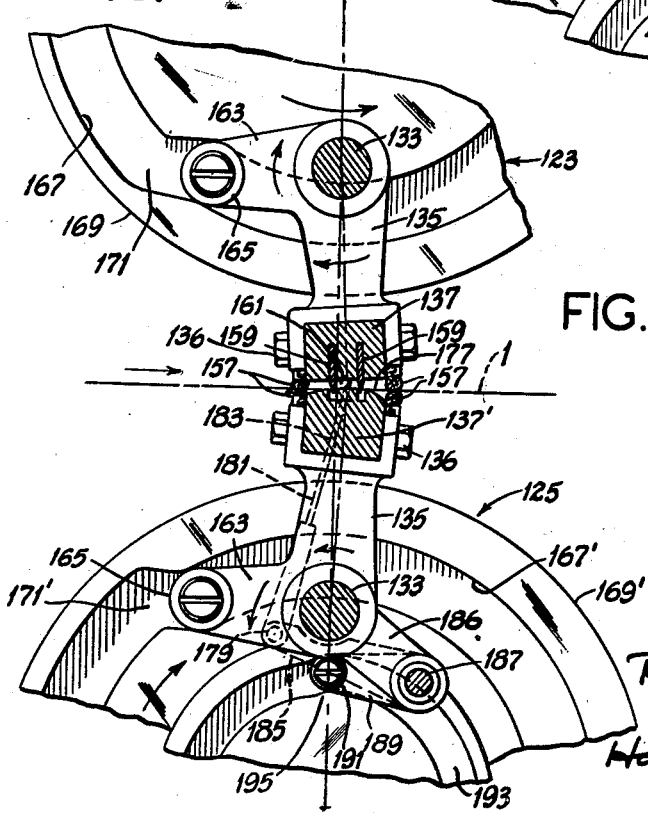
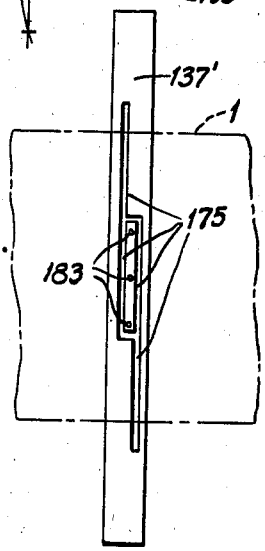

Patented Dec. 14, 1943

2,336,957

UNITED STATES PATENT OFFICE 2,336,957

CUTOFF MACHINE

Robert E. Pierce, Los Angeles, Calif., assignor to Bemis Bro. Bag Company, St. Louis, Mo., a corporation of Missouri Application October 2, 1942, Serial No. 460,586

13 Claims (Cl. 164—68)

This invention relates to cut-off machines, and with regard to certain more specific features, to cut-off machines for several moving webs.

Among the several objects of the invention may be noted the provision of a web cut-off machine which is particularly useful for cutting into sections multi-wall tubing such as is used for paper bags, which machine effects cut-off by an action eliminating substantially all longitudinal tearing, thereby providing a neat and smooth separating cut, whether straight or angular, with all edges of any multi-wall material flush; the provision of apparatus of the class described which effects cutting by a simple mechanism which is always operative at equal time intervals but which is equally effective for all web segment lengths as determined by any of the necessarily various speeds of passage of webbing through the machine; and the provision of a machine of the class described which introduces relatively few additional structural parts or complexities of operation over those required for conventional cut-off machines. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which is illustrated one of various possible embodiments of the invention, Fig. 1 is a top plan view of apparatus embodying the invention;

Fig. 2 is a vertical section taken on line 2—2 of Fig. 1;

Fig. 3 is a right-side elevation of Fig. 1;

Fig. 4 is a vertical section taken on line 4—4 of Fig. 1;

Fig. 5 is a fragmentary enlarged vertical section of a pair of cutter elements shown in position about to commence a cut;

Fig. 6 is a view similar to Fig. 5 showing the completion of a cutting action and start of a stripping action;

Fig. 7 is an enlarged detailed section taken on line 7—7 of Fig. 1;

Fig. 8 is a fragmentary bottom plan view of Fig. 7;

Fig. 9 is a diagrammatic bottom plan view of a straight upper blade and cutter bar, being viewed from line 9—9 of Fig. 2;

Fig. 10 is a diagrammatic top plan view of a straight lower cutter recess member (adapted to cooperate with the blade shown in Fig. 9) and being viewed from line 10—10 of Fig. 2;

Fig. 11 is a view similar to Fig. 9, but showing an alternative form of blade, and being viewed from line 11—11 of Fig. 2;

Fig. 12 is a view similar to Fig. 10 but showing the recess arrangement for cooperating with the blade arrangement of Fig. 11, being viewed from line 12—12 of Fig. 2;

Figure 1:
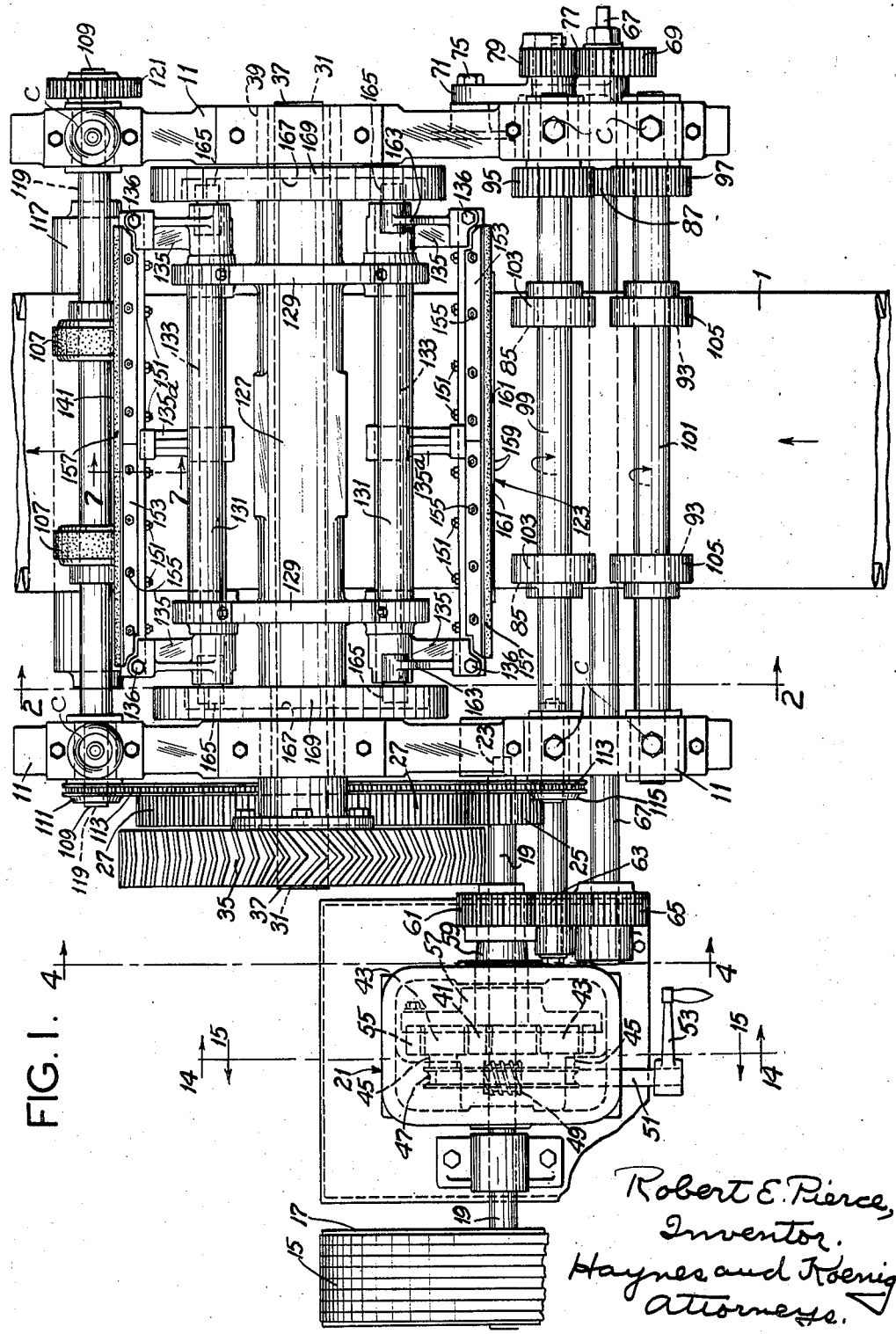

Fig. 13 is a diagrammatic plan view of multi-wall tubing indicating thereon the arrangements of alternate cuts performed by the present machine; and, Figs. 14 and 15 are respectively vertical detail sections on lines 14—14 and 15—15 of Fig. 1.

Similar reference characters indicate corresponding parts throughout the several views of the drawings.

It has heretofore been the practice to cut tubing, particularly multi-ply paper tubing for paper bags and the like, into desired lengths by means of a pair of cooperating rotary cutters. Such cutters would be less troublesome than they are if only one predetermined length of tubing segments were to be cut on a given machine, because then the rate of advance of the cutter while cutting could be made equal to the rate of advance of the tubing web through the machine. As a practical matter it is important that a given cutting machine be adapted to successfully cut web segments to various lengths for making various bag sizes.

Heretofore it has not been feasible in a simple machine to make the separating cut without introducing an endwise tearing action. In the case of single-ply tubing this tearing action produces a ragged edge, and in the case of multi-tubing it, in addition, causes an undesirable step-like relationship between the edges of the various plies. The results are particularly undesirable in the cases where any part of the cut is longitudinal of the finished bag, as in the case of the angular cut necessary for making the end of a valved bag.

The present invention solves the above difficulties by means of a mechanism adapted to provide a laterally smooth and even cut (either straight or angular) on multi-ply tubing, which cut is accurate and flush throughout the plies, regardless of the length of tubing segments for which the machine is set.

Referring now more particularly to Fig. 1, there is shown at numeral 1 a web of multi-ply paper tubing. The individual plies are not shown because of the small scale, but it is to be understood that there may be for example three plies of paper. This tubing may be gusseted at the edge or not, but the gusseted form is shown.

In Fig. 13 is shown how the tubing is to be cut up to form tubing segments from which paper bags are to be made. Numerals 3 indicate straight lateral cuts for forming the bottom edges of the bags, and numeral 5 indicates in general an angular cut from which the tops of the bags are to be made, such cuts involving off-set portions 7 from which, respectively, the inlet valve of each bag is made. The loose rectangular paper strip 9 between these off-sets 7 is to be removed from each cut 5. How the bags are formed from this point on is of no moment to the present invention, and there are various known ways of performing the finishing operation. It suffices to say that the blanks between cuts 3 and 7 are the intermediate product made by the present machine, the raw material upon which the machine works being the continuous web of tubing.

Referring to Figs. 1–4, numeral 11 indicates the frame of the machine. Adjacent to the frame 11 is a motor 13 which, through a belt drive 15, drives a pulley 17 on a drive shaft 19. This drive shaft 19 extends straight through an epicyclic gear box 21 and near a bearing 23 in the frame 11 carries a driving pinion gear 25. This pinion gear 25 meshes with a larger gear 27. Gear 27 and a concentric lower herringbone gear 29 are keyed to a lower shaft 31 passing through bearing 33 in frame 11. The herringbone gear 29 meshes with an upper herringbone gear 35 of equal number of teeth, the latter being carried upon a shaft 37 which passes through bearings 39 in the frame 11. By means of the stated gear train the shafts 31 and 37 are caused by the motor 13 to rotate in the opposite directions shown in Figs. 2 and 3. These shafts 31 and 37 carry certain reels for supporting cutting elements, and will be described hereinafter.

Within the epicyclic gear box 21 is an adjustable take-off drive which consists in a driving gear 41 keyed to the shaft 19. This gear 41 meshes with intermediate gears 43 rotary on studs 45, and the latter being carried epicyclically upon studs on the side of a rotary worm wheel member 47. The angular position of the worm wheel 47 may be adjusted from a meshing worm 49 carried on a shaft 51. Shaft 51 is under control of an exterior crank 53 for adjustment purposes.

The intermediate gears 43 also mesh with an internal gear 55 which is bolted to a carrier spider 57. The spider 57 is keyed to a quill 59 which passes out of the gear box 21 and externally has attached to it a pinion 61. The quill 59 is rotary on shaft 19.

From the above it will be seen that power pinion 41, through intermediate gears 43, will rotate the internal gear 55, and thus the spider 57 along with the quill 59. This rotates the pinion 61 with respect to the shaft 19. When it is desired to change the rotary phase relationship of the gear 61 with respect to the gear 25, this may be done by rotating the handle 53. Rotation of the handle 53 re-orients the intermediate gears 43 by rotating their stud supports 45, and during the re-orientation angularly sets the gear 55 either backward or forward. This involves epicyclic action of the gears 43 around gear 41. The adjustment may be made either while the machine is stationary or in motion. The purpose of the adjustment will appear.

The pinion 61 meshes with an idler 63 (Figs. 1 and 4) which in turn meshes with a pinion 65. The latter is keyed to a shaft 67 which passes through bearings in both sides of the frame 11 to the opposite side of the machine (Figs. 1 and 3). Here the shaft 67 carries a change gear 69. In conjunction therewith is also a rotary support for a gear sector plate 71. The plate 71 has slots 73 for locking cooperation with locking studs 75 and also carries a rotary change gear 77. The change gear 77 meshes with a gear 79 on a lower cross-shaft 81 carried in the frame 11. Inside of the frame 11 the shaft 81 carries a gear 83 and also two lower draw rollers 85 which are adjustable longitudinally for accommodation to various web widths. The gear 83 meshes with an idler 87 which in turn meshes with a gear 89 on another lower cross-shaft 91, also carried in the frame 11. The cross-shaft 91 carries another pair of lower draw rollers 93 which, as in the case of the rollers 85, are adjustable longitudinally.

The gears 83 and 89 respectively mesh with gears 95 and 97 carried upon upper cross-shafts 99 and 101 respectively. The shafts 99 and 101 are also supported in the frame 11. These shafts 99 and 101 respectively carry upper draw rollers 103 and 105, adjustable longitudinally for accommodation to various web widths. From the above it will be seen that the draw rollers 85, 93, 103 and 105 are driven in the directions indicated to draw the web of paper 1 into the machine. In order to eject the segmented web from the machine, resilient upper delivery rollers 107 are mounted adjustably upon a cross-shaft 109 having a rotary support in the frame 11. This cross-shaft 109 carries a sprocket 111 which has a 1:1 ratio chain drive connection 113 with a sprocket 115 carried on the shaft 99. The upper delivery rollers 107 cooperate with a solid lower metal delivery roller 117, the latter being located upon a shaft 119 carried in bearings in the frame 11. Outside of the frame 11 the shafts 109 and 119 are geared by means of gears 121 in a 1:1 ratio. The peripheral speeds of all of the rollers 93, 85, 103, 105, 107 and 117 are the same and in a direction to carry the web 1 through the machine between shafts 31 and 37.

Each of the shafts 37 and 31 carries what will hereinafter be referred to as a reel, the upper reel being indexed in the aggregate as 123 and the lower one as 125. Each reel has a central trunk 127 keyed to its respective shaft and each has a pair of supporting flanges 129 between which are spacing pillars 131. The general purpose of each of these reels is to carry a pair of cutting elements, related at 180°, so that for each revolution two cuts are made in the web 1.

The pair of cutting elements on the upper reel 123 are male elements and the pair on the lower reel 125 are female. This relationship could be reversed. The cutting elements on one side of each reel are for the purpose of making a straight cut such as shown at 3 in Fig. 13; and the pair of cutting elements on the other and opposite side of each reel are for the purpose of making the angular cut (with a removed central part), such as shown at 7 in Fig. 13.

Referring first to the upper reel 123, it carries between the plates 129 oppositely located rocking shafts 133. From each shaft 133 extend two end arms 135 and a central arm 135a, each set of three arms carrying a knife block held to the ends of the arms by bolts 136. The blocks are differently identified as 137 and 139. The difference in identification is to distinguish these blocks from the viewpoints of the forms of blades which they carry for making the cuts 5 and 3. Block 139, also shown in Fig. 7, carries a single straight blade 141 (Figs. 7–9) which is set into a groove 143 and held in place by one or more taper pins 145. These are set in tapered holes 147. The holes 147 partially intersect the groove 143, as shown in Fig. 8, so that the flat sides 149 of the pins 145 will wedgingly hold the blade 141 in place upon tightening up a nut and stud combination 151 (Fig. 7). On its longitudinal edges the block 139 carries clamp bars 153 held down by nut and stud combinations 155. These bars 153 clamp in place looped strips of resilient material such as rubber 157. The looped resilient strips form resilient tubular portions running parallel on opposite sides of the blade 141.

The block 137 likewise carries clamping elements 153 and 155 for resilient tubular portions 157; but the blade arrangement in the block 157 is different, so as to form the angled cut 7 (Figs. 11 and 13). There are a pair of long blades 159 and a pair of short cross blades 161. These blades are also held in place by means of wedges such as the wedges 145 above described but not again shown.

The supporting arms 135 and 135a are attached to and may rock with the shafts 133. To control the rocking of the shafts 133, each one carries, outside of the flanges 129, endwise rocker arms 163. On the ends of arms 163 are follower rollers 165. The rollers 165 operate in grooves 167 respectively in stationary cams 169 affixed to the frame 11 (see, for example, the holding studs 170 in Fig. 3). The grooves or races 167 in the oppositely located cams 169 are the same in outline and in phase relationship, so that the oppositely located rollers 165 associated with a given shaft 133 will in operation have equal time phases. Toe portions 171 are oppositely located in the opposite cams. The purpose of the followers 165 and cams 167 is to cause the respective cutter bars 137 and 139 to move predeterminately as they approach a point of tangency with respect to the web 1 for purposes the details of which will appear.

On the lower reel 125 like numerals designate parts like those on the upper reel. These parts consist in the central trunk 127 (carried on shaft 31), flanges 129, spacing pillars 131, rocking shafts 133, and arms 135 attached to and extending from the rocking shaft 133. On the rocking shafts 133 are also control arms 163 with their followers 165. One difference in construction is that the cutter blocks 137′ and 139′ are of female form (see grooves 175 and 173 respectively) for cooperation with the blades in blocks 137 and 139 respectively (see Figs. 9–12).

The herringbone gears 29 and 35 properly phase the motions of reels 125 and 123 so that as the reels rotate, the blade 141 swings into notch 173 and the blades 159, 161 swing into notches 175. Resilient tubular cushions 157 are also attached to the blocks 139′ and 137′ for resilient engagement with the cushions 157 on the blocks 139 and 137.

The followers 165 in this lower reel 125 operate in groove 167′ in fixed lower cams 169′. This is indicated in Fig. 5 where the step 171′ in the groove 167′ is shown opposite the step 171 in the groove 167 in the cam 169. Thus while the reels 123 and 125 rotate oppositely, blocks 137 and 137′ are normally inward as a tangential cooperating cutting relationship is reached (compare Figs. 5 and 6). This is caused by the action of the followers 165 before reaching the notches 171 and 171′. During the approach action, the opposite pairs of resilient clamps 157 engage one another and clamp or hold the web 1 ahead of and behind the region where it is to be cut (Fig. 5). This insures that the portion 177 of the web 1 hedged between the clamps 157 shall move at the same velocity as the cutting elements, during the cutting action about to occur, regardless of the rate at which the remainder of the web moves. The web under certain conditions may loop somewhat in the region of approach to the cutter element, but the portion clamped between the resilient members 157 will be unaffected and therefore be properly cut.

Between Figs. 5 and 6, the followers 165 traverse the notches 171 and 171′, which has the effect of bringing the arms 135 and 135a into a more radial position on the reels and in effect pushes the cutter blocks 137 and 137′ outwardly respectively with respect to the reels. This means that these blocks approach one another with a snap action of an essentially radial character (with respect to the web 1) with a continued peripheral component of motion tangent to the line of web movement. This action also brings about what may be characterized as a toggle action involving the two reels on their respective centers, the arms 135 operating on their centers on the reels, and the reactions due to the resilient strips 157 (see the center lines in Figs. 5 and 6). After cutting has been completed, the bars 137 and 137′ gradually separate due to their peripheral motion. The grooves 167 and 167′ are designed from this point on as a gradual outwardly directed spiral around to the notches 171 and 171′, respectively, which has the effect of again angling arms 135 forward from their radial positions and shortening the radius at which the blocks 137 and 137′ move, so that upon next approaching the web 1, the blocks are again ready for the quick radial cutting movement.

From Figs. 11, 12 and 13 it will be seen that a small rectangle of paper must be removed to provide the paper valve extensions 7. In order to strip this away from the segmental blanks which pass from the machine a needle bar 179 is used, carrying a number of needles 181. The needles pass loosely through openings 183 in the space between the grooves 175 in block 137′. This needle bar is pivotally supported on arms 185 which are mounted upon a rocker 187 supported between extensions 186 from the arms 135. Suitable openings 188 (Fig. 2) in plates 129 allow for motion of 187 as arms 186 rock with 135. The rocker shaft 187 is rotated on its own center by arms 189 carrying roll followers 191 which operate within inner grooves 193 of the lower cams 169′. A notch 195 in each groove 193 causes the needles 181 to rise through the block 137′ at the time that the web is cut, thus piercing the rectangle of cut-out paper between the angular grooves 175 and blades 159, 161. Then as the blocks 137 and 137′ separate, this rectangular paper is abstracted from the blades 159, 161 and is carried around with the block 137′ until the remaining spiral form of the groove 193 causes retraction of the needles 181 so that this paper is dropped from the block as the latter traverses the bottom of the machine. The forwardly angled positions of the needles 181 cause them better to pick out the waste 9 from blades 159, 161. It will be clear that no corresponding needle stripper construction is used in association with the blocks 139 and 139′, because there is no waste paper associated with the bottom-forming cuts 3.

In order to support and guide the web 1 through the machine, tables 197 and 198 are used, as shown in Fig. 2.

Operation is as follows:

The web 1 is drawn into the machine by the rollers 93, 105, 85, 103 and proceeds between the reels 123 and 125. Tables 197 and 198 guide it. During movement it is caught and resiliently held between the tabs 157 associated, for example, with the blocks 137 and 137'. As these blocks approach tangential cooperating cutting relationship (Fig. 5), the clamped part of the paper hedged between the resilient strips 157 must travel at the same rate as the blocks 137, 137', so that when, for example, blades 159, 161 enter groove 175, there is substantially no relative longitudinal motion between the blades and the paper. While the peripheral velocity of the blocks is reduced because of the rocking action of the supporting shaft 133 caused by the followers 165 acting in the notches 171 and 171', the blocks 137 and 137' swing into action from the position of Fig. 5 to that shown in Fig. 6. Cutting takes place while the needles 181 rise to extract the rectangular portion of paper between grooves 175. Hence upon separation of blocks 137 and 137', this block of paper is withdrawn. The separated web segments are drawn from the machine by the rollers 107, 117. The action is similar as to blocks 139, 139', except that no needle action is involved and the cut is straight.

The length of a web segment is determined by the speed with which the web material is fed between the reels between constantly timed periods of cutting action, and this speed is under control of the change gears 69 and 77. The larger gear 69 is, the greater is the speed. It is preferable that for the shortest tube length desired the tangential velocity of the blocks 137, 137', and 139, 139', when they co-operate respectively, shall be about equal to the web speed. This means that for a longer length of tube, the web will be passing through the machine faster than the tangential velocity of the blocks, but this will not affect the relative velocity of the paper at the cutting point, because the area 177 is clamped between the resilient members 157. Any part of the web that is advancing too fast toward this point merely loops up temporarily on the table 198 and any tendency of the take-off rolls 107, 117 to pull these separated segments out too fast is met by slippage between these rolls 107, 117 and these segments. All roller sets are provided with suitable pressure controls C for controlling the pulling force due to friction. The pressure between rolls 107 and 117 is made enough to draw the web through without slippage in between cutting operations but not so much that slippage cannot take place at the rolls when a fast moving web is gripped by clamps 157 and temporarily slowed up. This avoids tearing the web over platen 197 when cutting of it takes place. Thus the resilient clamps 157 positively hold the paper adjacent to the blades at blade speed regardless of the various web speeds required for the various tube sizes. Consequently the desirable cutting action is the same for any length of tube being produced.

Orientation or phasing of the cuts is effected by the differential adjustment from crank 53, whether or not the machine is in motion.

It is to be understood that various blade shapes may be used, and if narrower or wider rectangular segments 9 are to be removed between the angular valve extensions 7, accordingly various numbers of holes 183 in bar 137' and needles 181 may be employed on the bar 179.

It will be seen, by comparing Figs. 5 and 6, that the rocking cutter action starts before the centers of the rocking shafts 133 reach the vertical center lines between the reel centers, and that the rocking action is completed by the time the center line is reached (Fig. 6). Since the rocking action has the effect of moving the cutter blocks outward from the center of the reel, it will be seen that one effect is to prevent the cutter blocks from coming into engagement as soon as they would if they were rigidly attached to the reel. Thus the cutters do not depend for their relative movement entirely upon their movements in circles, but they have an additional sudden movement toward one another which reaches its maximum as the center line between the reels is reached. This, along with the clamping action at 157, has the effect of providing a more lateral and accurate cut. This very accurate lateral cut causes all plies in a multi-ply blank to be all of the same length, rather than arranged in lapping or feathered fashion as heretofore when cutters which were affixed to rotary members operated by a perforating and tearing action.

The resilient pads 157 may be referred to as hedging the blades between them, so that when these resilient pieces clamp the web, all of the hedged blade portions and the paper move in unison.

From the above it will be seen that the objects of the invention are accomplished, namely accurate lateral cut-off of lengths or blanks from a multi-ply web moving at high speeds and the facility of the machine to handle the various desired lengths to be cut, without the necessity for making any complex adjustment of the cut-off elements of the machine.

As many changes could be made in the above constructions without departing from the scope of the invention, it is intended that all matter contained in the above description or shown in the accompanying drawings shall be interpreted as illustrative and not in a limiting sense.

I claim:

1. Web cut-off apparatus comprising a frame, draw rolls for drawing a web from a supply, delivery rolls for ejecting separated lengths of web, rotary reels on opposite sides of the web and located between said draw and delivery rolls, cutter elements on opposite sides of the web and having respectively rocking mounts upon the respective reels, cam means responsive to movement of the reels for rocking the cutter elements, the cutter elements being driven tangently to the web by rotation of the reel and being driven radially toward one another at the point of tangency by the rocking action in order to cooperate to intersect the webs.

2. Web cut-off apparatus comprising a frame, draw rolls for drawing a web from a supply, delivery rolls for ejecting cut-off lengths of web, rotary reels on opposite sides of the web and between said draw and delivery rolls, cutter elements on opposite sides of the web and having respectively rocking mounts upon the respective reel, cam means for rocking the cutter elements, the cutter elements being driven to a point adjacent to opposite sides of the web by rotation of the reels and being driven radially toward one another by the rocking action to cooperate to intersect the web.

3. Web cut-off apparatus comprising a frame, draw rolls for drawing a web from a supply, delivery rolls for ejecting cut-off lengths of web, rotary reels on opposite sides of the web and between said draw and delivery rolls, cutter elements on opposite sides of the web and having respectively rocking mounts upon the respective reel, cam means for rocking the cutter elements, the cutter elements being driven to a point adjacent to opposite sides of the web by rotation of the reels and being driven outward toward one another by the rocking action to cooperate to intersect the web, and resilient means before and behind the cutting elements and cooperating to clamp a local region of the web at the cutting region for movement at a velocity substantially equal to the velocity component of the cutting means in the direction of the web.

4. Web cut-off apparatus comprising a frame, draw rolls for drawing a web from a supply, delivery rolls for ejecting separated lengths of web, rotary reels on opposite sides of the web and between said draw and delivery rolls, cutter elements on opposite sides of the web and having respectively rocking mounts upon the respective reel, cam means for rocking the cutter elements, the cutter elements being driven to a point adjacent to opposite sides of the web by rotation of the reel and being driven outward toward one another by the rocking action to cooperate to intersect the webs, and resilient means before and behind the cutting elements and cooperating to clamp a local region of the web at the cutting region for movement substantially equal to the speed component of the cutting means in the direction of the web, said delivery rolls having a frictional engagement with the web of a degree adapted for ejection after release by said clamping means but adapted to slip if necessary while said clamping means is effective during cutting.

5. Web cut-off apparatus comprising a frame, draw rolls for drawing a web from a supply, delivery rolls for ejecting separated lengths of web, rotary reels on opposite sides of the web and between said draw and delivery rolls, cutter elements on opposite sides of the web and having respectively rocking mounts upon the respective reel, cam means for rocking the cutter elements, the cutter elements being driven to a point adjacent to opposite sides of the web by rotation of the reel and being driven outward toward one another by the rocking action to cooperate to intersect the webs, and resilient means before and behind the cutting elements and cooperating to clamp a local region of the web at the cutting region for movement substantially equal to the speed component of the cutting means in the direction of the web, said delivery rolls having a frictional engagement with the web of a degree adapted for ejection after release by said clamping means but adapted to slip if necessary while said clamping means is effective during cutting, said draw rolls enforcing a loop of webbing ahead of the clamped web when the movement of the web from the supply is faster than the movement of the clamped portion of the web.

6. Web cut-off apparatus comprising a frame, adjacently located, oppositely rotating reels carried by the frame, means for moving the web between the reels in the direction of their movement where they are adjacent to one another, stationary cams adjacent to the reels, oppositely located rocker means respectively on the reels and having followers in cooperation with said cams, cutter means for the web on the rockers, the cams and the followers being arranged to move the cutter means with an outward component with respect to the reel centers as the cutters approach one another to intersect the web.

7. Web cut-off apparatus comprising a frame, adjacently located, oppositely rotating reels carried by the frame, means for moving the web between the reels in the direction of their movement where they are adjacent to one another, stationary cams on the frame and adjacent to the reels, oppositely located rocker means respectively on the reels and having followers in cooperation with said cams, cooperating cutter means for the web on the rockers, the cams and the followers being arranged to rotate the cutters outward and back with respect to the reels as the cutters intersect the web.

8. Web cut-off apparatus comprising a frame, adjacently located, oppositely rotating reels carried by the frame, means for moving the web between the reels in the direction of their movement where they are adjacent to one another, stationary cams on the frame and adjacent to the reels, oppositely located rocker means respectively on the reels and having followers in cooperation with said cams, cooperating cutter means for the web on the rockers, the cams and the followers being arranged to rotate the cutters outward and back with respect to the reels as the cutters intersect the web, and clamping means on the respective cutter means adapted to cooperate to clamp a local region of the web adjacent the cutting means while cutting and to enforce movement of said local region at the cutter speed along the web.

9. Web cut-off apparatus comprising a frame, adjacently located, oppositely rotating reels carried by the frame, means for moving the web between the reels in the direction of their movement adjacent to one another, stationary cams adjacent to the reels, oppositely located rocker means respectively on the reels and having followers in cooperation with said cams, cooperating cutter means for the web on the rockers, the cams and the followers being arranged to move the cutter means with an outward component with respect to the reel centers as the cutters cooperate with one another to intersect the web, and resilient clamping means on the cutter means adapted to clamp a local region of the web for temporary motion equal to the component of motion of the cutter means parallel to the web while cooperating to cut.

10. Web cut-off apparatus comprising a frame, adjacently located, oppositely rotating reels carried by the frame, means for moving the web between the reels in the direction of their movement adjacent to one another, stationary cams adjacent to the reels, oppositely located rocker means respectively on the reels and having followers in cooperation with said cams, cooperating cutter means for the web on the rockers, the cams and the followers being arranged to move the cutter means with an outward component with respect to the reel centers as the cutters cooperate with one another to intersect the web, resilient clamping means on the cutter means adapted to clamp a local region of the web for temporary motion equal to the component of motion of the cutter means parallel to the web while cooperating to cut, blades on one cutting means arranged to form a loose web area portion during cutting, a stripper needle mounted for rocking on the other cutting means, and a cam for effecting rocking of the stripper needle so that it intersects the loose web area during cutting and is retracted therefrom for releasing it after separation of the cutting elements from the web.

11. In a cut-off machine, a rotary reel adjacent to a web moving tangentially thereto, a rotary cutting means on the reel and being peripherally driven thereby to move tangentially to the web, a cam, follower means on the rotary cutting means cooperating with the cam, the cam being shaped to force a temporary outward swinging motion of the cutting means with respect to reel rotation as tangency is approached.

12. In a cut-off machine, a rotary reel adjacent to a web moving tangentially thereto, a rotary cutting means on the reel and being peripherally driven thereby to move into tangency to the web, a cam, follower means on the rotary cutting means cooperating with the cam, the cam being shaped to force a temporary backward and outward swinging motion of the cutting means with respect to reel rotation as tangency is approached.

13. In a cut-off machine, a rotary reel adjacent to a tangentially moving web, a rotary cutting means on the reel and being peripherally driven thereby to swing into tangency to the web, a cam, follower means on the rotary cutting means cooperating with the cam, the cam being shaped to force a temporary outward swinging motion of the cutting means with respect to reel rotation as tangency is approached, and rocking stripper means associated with the cutting means, a second cam, a second follower on the rocking stripper means cooperating with said second cam, said second cam being shaped to move the stripper means relatively to the cutting means.

ROBERT E. PIERCE.